(12) United States Patent
Mercier et al.

(10) Patent No.: US 10,778,954 B1
(45) Date of Patent: *Sep. 15, 2020

(54) MULTIFOCAL TEST SYSTEM

(71) Applicant: Facebook Technologies, LLC, Menlo Park, CA (US)

(72) Inventors: Olivier Mercier, Redmond, WA (US); Yusufu Njoni Bamaxam Sulai, Snohomish, WA (US); Kevin James MacKenzie, Sammamish, WA (US); Marina Zannoli, Redmond, WA (US); James Hillis, Redmond, WA (US); Derek Nowrouzezahrai, Menlo Park, CA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,853

(22) Filed: May 1, 2019

Related U.S. Application Data

(63) Continuation of application No. 15/874,174, filed on Jan. 18, 2018, now Pat. No. 10,326,977.

(60) Provisional application No. 62/448,301, filed on Jan. 19, 2017.

(51) Int. Cl.
*H04N 13/144* (2018.01)
*H04N 13/344* (2018.01)
*H04N 13/383* (2018.01)
*G09G 5/10* (2006.01)

(52) U.S. Cl.
CPC ............. *H04N 13/144* (2018.05); *G09G 5/10* (2013.01); *H04N 13/344* (2018.05); *H04N 13/383* (2018.05); *G09G 2320/0626* (2013.01); *G09G 2354/00* (2013.01)

(58) Field of Classification Search
CPC .. H04N 13/144; H04N 13/344; H04N 13/383; G09G 5/10; G09G 2320/0626; G09G 2354/00
USPC .......................................................... 348/53
See application file for complete search history.

(56) References Cited

U.S. PATENT DOCUMENTS

| | | | |
|---|---|---|---|
| 9,921,413 B2 | 3/2018 | Xu | |
| 10,432,908 B1 | 10/2019 | Mercier et al. | |
| 2011/0317908 A1* | 12/2011 | Park | G03F 1/70 382/145 |
| 2016/0124295 A1* | 5/2016 | Montgomery | G02B 13/16 353/10 |
| 2016/0363770 A1* | 12/2016 | Kim | G02B 27/0172 |

(Continued)

OTHER PUBLICATIONS

United States Office Action, U.S. Appl. No. 16/523,195, dated Nov. 15, 2019, 7 pages.

(Continued)

*Primary Examiner* — Allen C Wong
(74) *Attorney, Agent, or Firm* — Fenwick & West LLP

(57) ABSTRACT

A multifocal test system is described herein. The system includes a plurality of displays located at different focal distances. Each display includes a plurality of pixels with pixel intensity values. The system includes an eye tracking system that determines eye tracking information about a position of an eye relative to the displays. A controller is configured to determine pixel intensity values based on decomposition of a scene across the plurality of displays, and the position of the eye.

20 Claims, 7 Drawing Sheets

(56) References Cited

U.S. PATENT DOCUMENTS

2018/0196263 A1* 7/2018 Vallius .................. G02B 27/01
2019/0138088 A1 5/2019 Evans et al.

OTHER PUBLICATIONS

Akeley, K. et al., "A Stereo Display Prototype with Multiple Focal Distances," ACM Trans. Graph., ACM, 2004, DD. 804-813, vol. 23, No. 3.

Burge, J. et al., "Optimal Defocus Estimation in Individual Natural Images," PNAS, Oct. 4, 2011, pp. 16849-16854, vol. 108, No. 40.

Held, R. T. et al., "Blur and Disparity are Complementary Cues to Depth," Current Biology, Mar. 6, 2012, DD.426-431, vol. 22.

Hu, X. et al., "High-Resolution Optical See-Through Multi-Focal-Plane Head-Mounted Display Using Freeform Optics," Optics Express, Jun. 2, 2014, pp. 1-8, vol. 22, No. 11.

Liu, S. et al., "A Systematic Method for Designing Depth-Fused Multi-Focal Plane Three-Dimensional Displays," Optics Express, May 24, 2010, pp. 11562-11573, vol. 18, No. 11.

Llull, P. et al., "Design and Optimization of a Near-Eye Multifocal Display System for Augmented Reality," Imaging and Applied Optics, Optical Society of America, 2015, pp. 1-3.

Love, G.D. et al., "High-Speed Switchable Lens Enables the Development of a Volumetric Stereoscopic Display," Optics Express, Aug. 31, 2009, pp. 1-10, vol. 17, No. 18.

MacKenzie, K. J. et al., "Accommodation to Multiple-Focal-Plane Displays: Implications for Improving Stereoscopic Displays and for Accommodation Control," Journal of Vision, 2010, DD. 1-20, vol. 10, No. 8.

MacKenzie, K. J. et al., "Vergence and Accommodation to Multiple-Image-Plane Stereoscopic Displays: "Real World" Responses with Practical Image-Plane Separations?" Journal of Electronic Imaging, Jan.-Mar. 2012, pp. 1-9, vol. 21, No. 1, 011002.

Matsuda, N. et al., "Focal Surface Displays," ACM Transactions on Graphics (SIGGRAPH Conference Proceedings), Jul. 2017, pp. 1-14, vol. 36, No. 4.

Metlapall Y, S. et al., "The Impact of Higher-Order Aberrations on the Strength of Directional Signals Produced by Accommodative Microfluctuations," Journal of Vision, 2014, pp. 1-13, vol. 14, No. 12, 25.

Narain, R. et al., "Optimal Presentation of Imagery with Focus Cues on Multi-Plane Displays," ACM Transactions on Graphics, Aug. 2015, pp. 1-12, vol. 34, No. 4, Article 59.

Ravikumar, S. et al., "Creating Effective Focus Cues in Multi-Plane 3D Displays," Optics Express, Oct. 10, 2011, pp. 1-13, vol. 19, No. 21.

Zannoli, M. et al., "Blur and the Perception of Depth at Occlusions," Journal of Vision, 2016, pp. 1-25, No. 16, No. 6, 17.

* cited by examiner (Real World)

(3D Display)

MULTIFOCAL TEST SYSTEM

CROSS-REFERENCE TO RELATED APPLICATIONS

This application is a continuation of U.S. patent application Ser. No. 15/874,174, filed Jan. 18, 2018, which claims benefit of U.S. Provisional Patent Application Ser. No. 62/448,301, filed Jan. 19, 2017, which are hereby incorporated by reference in their entirety.

BACKGROUND

The present disclosure generally relates to test systems for measuring a response of an eye to images rendered on multiple focal planes, and specifically to the effect of the eye gaze direction with respect to multiple focal planes on a user's vergence and accommodation.

Vergence-accommodation conflict (VAC) is a phenomenon that occurs to users of three-dimensional displays and virtual-reality (VR) headsets. In normal situations, eyes converge (rotate toward one another) to focus on closer objects and diverge (rotate away from one another) to focus on objects that are further away. Accommodation is coupled with convergence, and is the process where the lenses of the eyes focus on a close or far away object. In three-dimensional displays and VR systems, these two processes are decoupled. The eyes accommodate to the fixed distance of the screen of the headset, but still verge to the perceived distance of the virtual object. This decoupling can cause the user to feel uncomfortable, disoriented, or nauseous.

Building multiple focal planes into the three-dimensional display may reduce the effect of VAC by providing multiple image planes that together span the viewer's accommodation range. Using the multiple focal planes, a single image can be decomposed across the multiple displays to simulate the relative focal blur, sharpness and depth that the user's eye would naturally produce. However, decomposition of an image across multiple displays is computationally costly and conventional techniques may not be able to render image content across the multiple displays in real-time. As a consequence, conventional decomposition techniques are not able to dynamically respond to eye movement, and are thus unable to correct for misalignment of an eye with the multiple focal planes or changes to an eye's vergence or accommodation. In addition, existing multifocal displays assume a single, fixed viewpoint directly perpendicular to the display surface, and do not provide ways to measure how the direction of a user's gaze effects the success of the decomposition.

SUMMARY

A system presented herein includes a plurality of displays configured to emit image light. At least two of the displays are located at different focal distances from one another, and each display includes pixels. Each pixel has a pixel intensity value. The system includes an eye tracking system, configured to determine a position of the eye relative to the displays. A processor is configured to determine the pixel intensity value for each pixel in at least a portion of the pixels to generate content for presentation to a user, based in part on decomposition of a scene related to the content across the displays and the position of the eye.

Figure 1A:
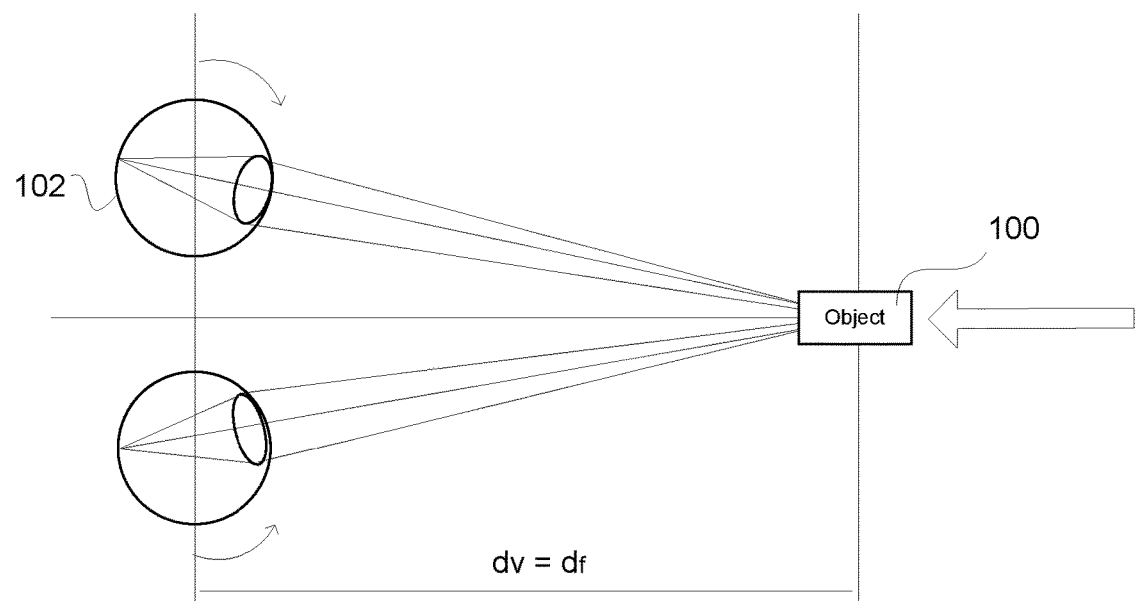
FIG. 1A shows the relationship between vergence and eye focal length in the real world, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Successfully reproducing a three-dimensional display is desirable in HMDs and other stereoscopic and multiscopic displays. To simulate depth of a field in HMDs, retinal defocus blur created by out-of-focus segments of a rendered image is synthesized. The retinal defocus blur can mitigate VAC by artificially re-coupling the vergence of a user's eye on the surface of HMD displays to the focal accommodation.

Using multifocal displays can mitigate VAC, since multiple image planes displayed at several distances from a user's eye can span a user's accommodation range. When using multifocal displays, a single image is decomposed to span each of the displays, with certain segments of the image being sharp and others blurred to reflect the vergence and accommodation of a user's eye with respect to the image. The scene decomposition thus distributes virtual objects across various image planes associated with the multifocal displays to produce retinal defocus blur and reduce VAC.

The system presented herein provides a multifocal decomposition test bed for measuring the effect of multifocal rendering and decompositions on the vergence and accommodation of a user's eye. The system includes an eye-tracker that allows for the multifocal decomposition to correct for eye movements and re-render an image decomposition in response to detected eye movements.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewer.

FIG. 1A shows the relationship between vergence and eye focal length in the real world, in accordance with one or more embodiments. In the example of FIG. 1A, the user is looking at a real object 100, i.e., the user's eyes are verged on the real object 100 and gaze lines from the user's eyes intersect at real object 100. As the real object 100 is moved closer to the user, as indicated by the arrow in FIG. 1A, each eye 102 rotates inward (i.e., converge) to stay verged on the real object 100. As the real object 100 gets closer, the eye 102 has to "accommodate" to the closer distance by adjusting the eye's lens to reduce the focal length. This accommodation adjustment is achieved through reflexive, automatic muscle movements. Thus, under normal conditions in the real world, the vergence distance ($d_v$) equals the accommodation distance ($d_f$).

Figure 1B:
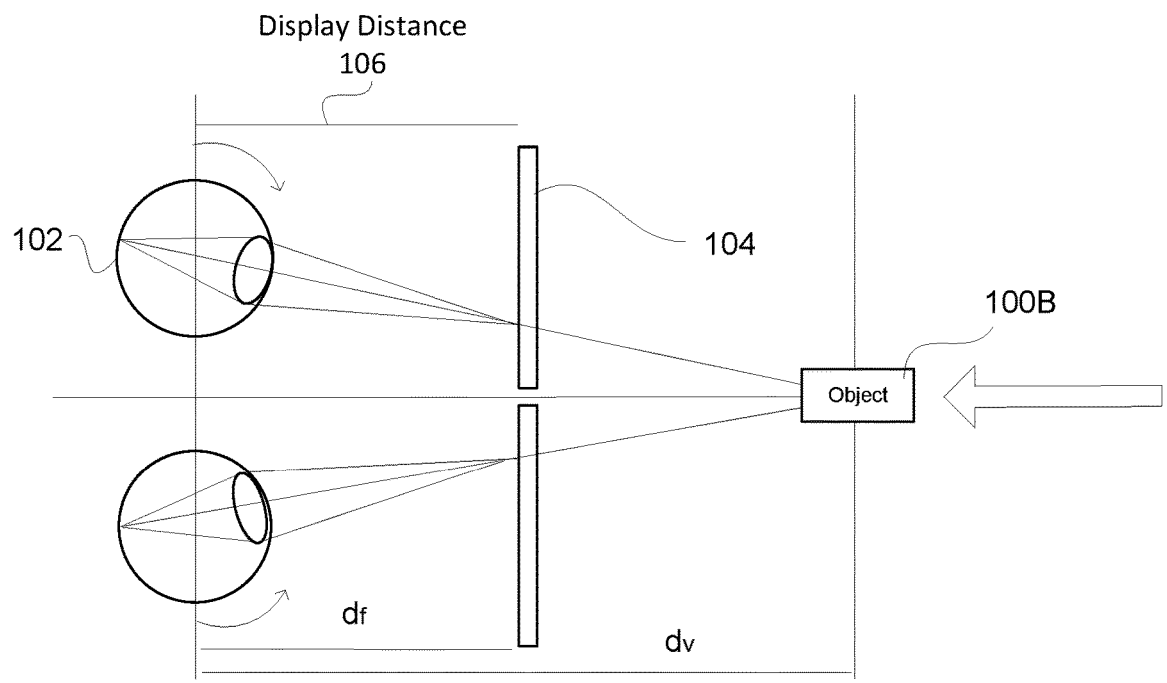
FIG. 1B shows the conflict between vergence and eye focal length in a three-dimensional display screen, in accordance with one or more embodiments.

FIG. 1B shows an example conflict between vergence and accommodation that can occur with stereoscopic three-dimensional displays, in accordance with one or more embodiments. In this example, a user is looking at the virtual object 100B displayed on a 3D electronic display 104; however, the user's eyes are verged on and gaze lines from the user's eyes intersect at the virtual object 100B, which is at a greater distance from the user's eyes than the 3D electronic display 104. As the virtual object 100B is rendered on the 3D electronic display 104 to appear closer to the user, each eye 102 again rotates inward to stay verged on the virtual object 100B, but the focus distance of the image is not reduced; hence, the user's eyes do not accommodate as in FIG. 1A. Thus, instead of increasing the optical power to accommodate for the closer vergence depth, eye 102 maintains accommodation at a display distance 106 associated with the 3D electronic display 104. Thus, the vergence depth (dv) often does not equal the focal length (df) for the human eye for objects displayed on 3D electronic displays. This discrepancy between vergence depth and focal length is referred to as "vergence-accommodation conflict" or VAC. A user experiencing only vergence or accommodation and not both will eventually experience some degree of fatigue and nausea, which is undesirable for virtual reality system creators.

The systems and methods described in the present disclosure mitigate VAC, and re-couple vergance and accommodation in a stereoscopic three-dimensional display by rendering a three-dimensional image that shows portions of the field of view in or out of focus to match the user's vergance. Thus, the rendered image simulates a focal field in which dv=df, causing the viewer's eye to accommodate not to the display distance 106, but to the simulated focal distance.

Figure 2:
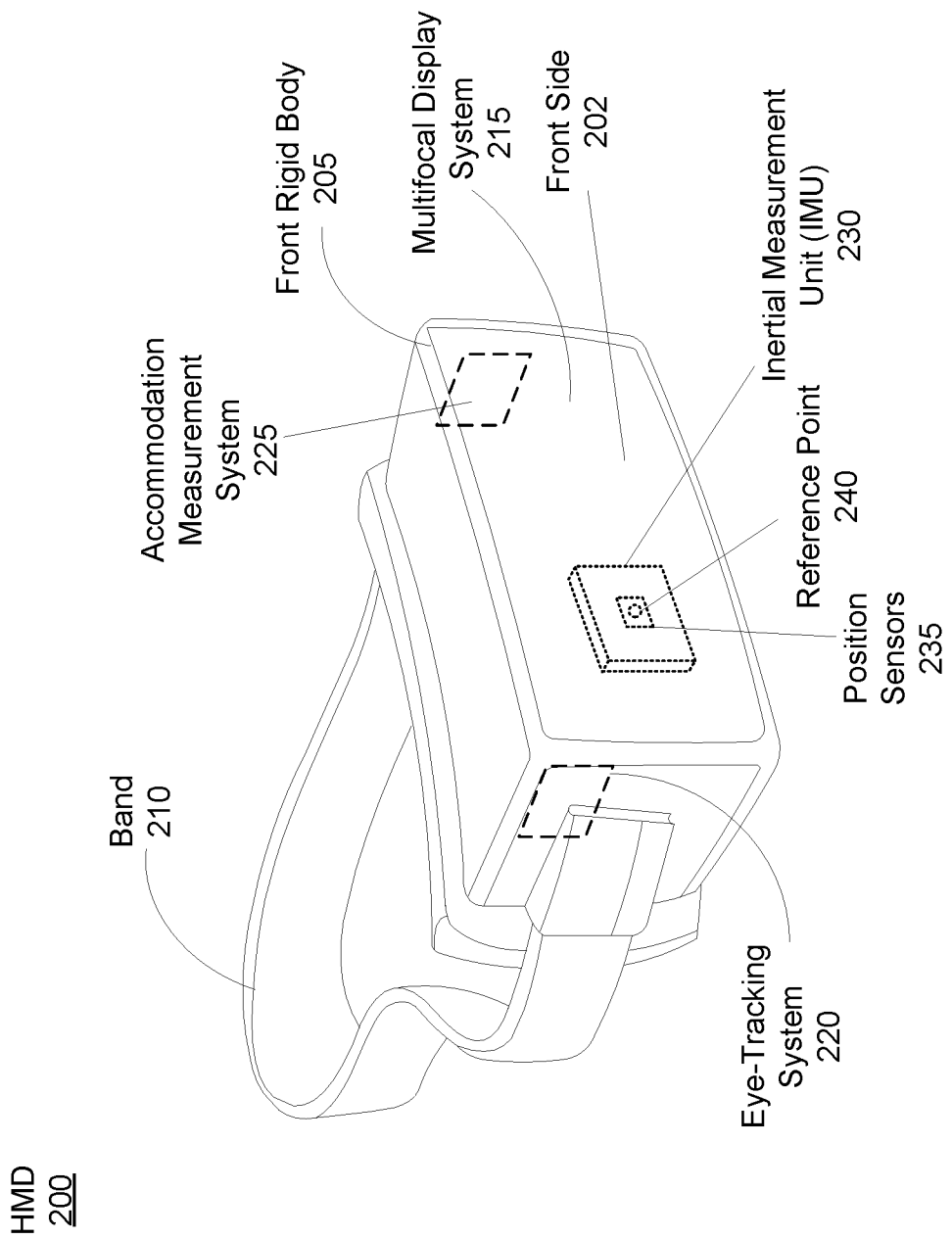
FIG. 2 is a diagram of a head-mounted display (HMD) with a multifocal display system, in accordance with one or more embodiments.

FIG. 2 is a diagram of a (HMD) 200 with a multifocal display system, in accordance with one or more embodiments. The HMD 200 may be part of an artificial reality system. In embodiments that describe an AR system and/or a MR system, portions of a front side 202 of the HMD 200 are at least partially transparent in the visible band (~380 nm to 750 nm), and portions of the HMD 200 that are between the front side 202 of the HMD 200 and an eye of the user are at least partially transparent (e.g., a partially transparent electronic display). The HMD 200 includes a front rigid body 205, and a band 210. The band 220 secures the HMD 200 to a user's head.

The front rigid body 205 includes a multifocal display system 215, an integrated eye-tracking system 220, and an accommodation measurement system 225. The front rigid body 205 may further include an Inertial Measurement Unit (IMU) 230, one or more position sensors 235, a reference point 240, and any number of additional sensors described in further detail with reference to FIG. 7.

The multifocal display system 210 provides an artificial reality environment to the user of the HMD 200. The multifocal display system 215 includes multiple displays, wherein at least two of the displays is located at different distances from a user's eye. The multifocal display system 215 displays an image to a user of the HMD 200 such that the image is decomposed onto the multiple displays. The multifocal display system 215 may be implemented as multifocal display systems 340 and 365 described in further detail with reference to FIG. 3. The multifocal display system 215 may be also implemented as a multifocal display system 725 described in further detail with reference to FIG. 7. An image may be decomposed on the multiple displays of the multifocal display system 215 in accordance with the methods described in FIG. 3-6.

The eye-tracking system 220 determines eye tracking information for a user's eye. The determined eye tracking information may comprise information about an orientation of the user's eye in an eye-box, i.e., information about an angle of an eye-gaze. The eye-box is a region in space that is occupied by a user's eye. In one embodiment, the user's eye is illuminated with structured light. Then, the eye tracking system 220 can use locations of the reflected structured light in a captured image to determine eye position and eye-gaze. In another embodiment, the eye tracking system 220 determines eye position and eye-gaze based on magnitudes of image light captured over a plurality of time instants. In some embodiments, the eye-tracking system 220 measures a direction vector of the user's eye-gaze. In some embodiments, the eye-tracking system 205 comprises an eye-tracking sub-system for each eye, as described in further detail with reference to FIG. 3. The eye-tracking system 220 may be also implemented as an eye-tracking module 740 described in further detail with reference to FIG. 7.

The accommodation measurement system 225 measures an accommodation of a user's eye to an image displayed on the multiple displays of the multifocal display system 215. The accommodation measurement system 225 includes a light source, which projects light onto a user's eye. The light is then reflected/scattered from at least one surface of the eye and captured by a sensor, such as a wavefront sensor (not shown in FIG. 2). A controller coupled to the sensor converts information about the light reflected from the at least one surface of the eye to determine an accommodation measurement. The accommodation measurement system 225 may represent the accommodation measurement system 375, and is described in further detail with reference to FIG. 3. The accommodation measurement system 225 may also represent the accommodation measurement system 745, described in further detail with reference to FIG. 7.

In the embodiment shown by FIG. 2, the position sensors 235 are located within the IMU 230, and neither the IMU 230 nor the position sensors 235 are visible to a user of the HMD 200. The IMU 230 is an electronic device that generates IMU data based on measurement signals received from one or more of the position sensors 235. A position sensor 235 generates one or more measurement signals in response to motion of the HMD 200. Examples of position sensors 235 include: one or more accelerometers, one or more gyroscopes, one or more magnetometers, another suitable type of sensor that detects motion, a type of sensor used for error correction of the IMU 230, or some combination thereof. The position sensors 235 may be located external to the IMU 230, internal to the IMU 230, or some combination thereof.

Figure 3:
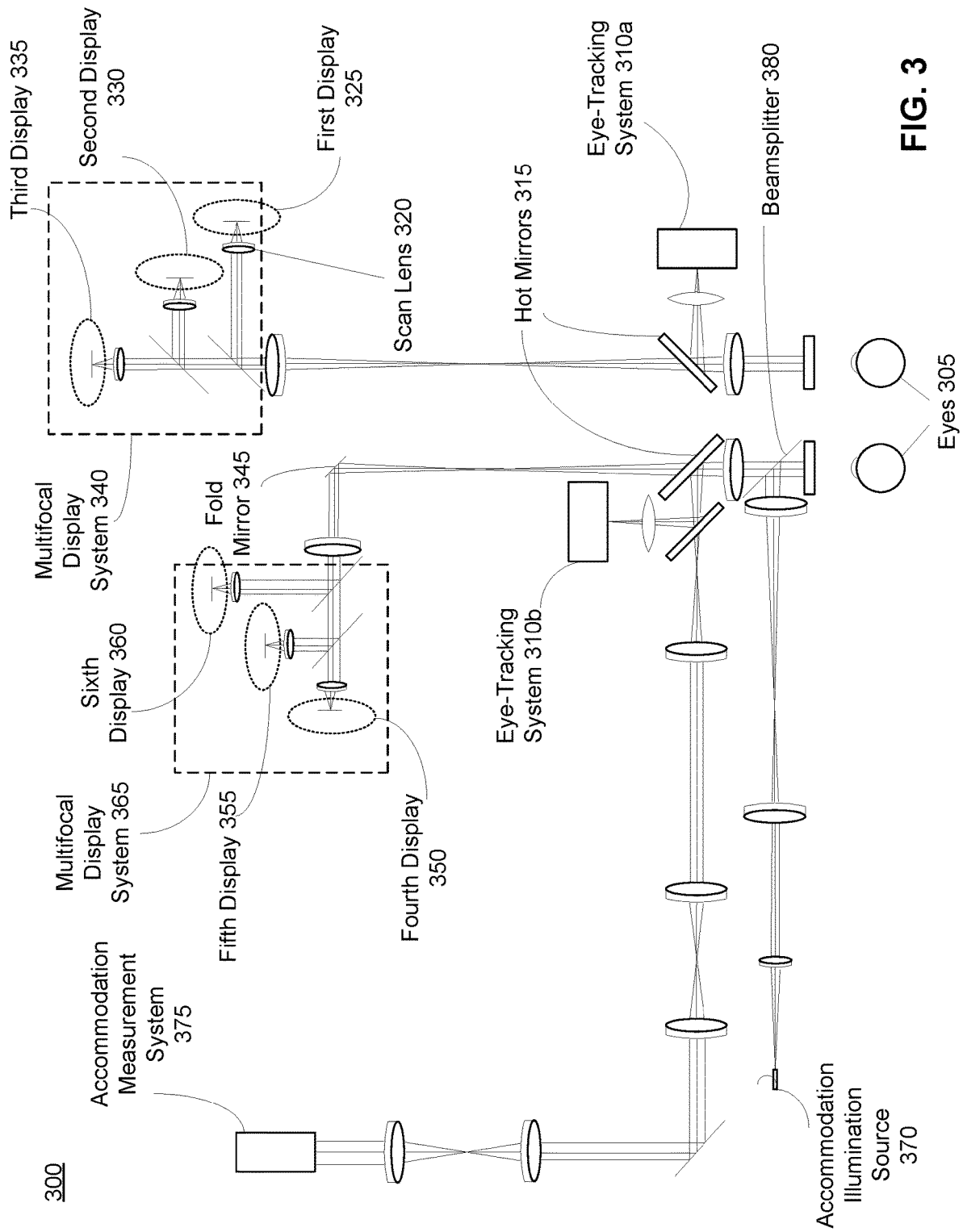
FIG. 3 is a diagram of a multifocal test system, in accordance with one or more embodiments.

FIG. 3 is a diagram of a multifocal test system 300, in accordance with one or more embodiments. The multifocal test system 300 measures the accommodation response and gaze direction of user's eyes 305 when an image is decomposed across multiple displays of multifocal display systems 340 and 365. The multi-focal display system 340 may include three displays, i.e., first display 325, second display 330, and third display 335 that display content to one of the eyes 305 (e.g., the right eye). A scan lens, such as a scan lens 320, is positioned in front of each display in the multi-focal display system 340. The multi-focal display system 365 may also include three displays, i.e., fourth display 350, fifth display 355, and sixth display 360, to display content to the other eye 305 (e.g., the left eye). In other embodiments, each multi-focal display system 340, 365 may have more than three displays. In yet other embodiments, each multi-focal display system 340, 365 may comprise two displays. Note that a fold mirror 345 redirects light from the multifocal display system 365 toward the eye 305 (e.g., the left eye 305).

Each of the displays in the multifocal display systems 340, 365 includes a plurality of pixels, each pixel having a certain light intensity level. The intensity level of each pixel within the displays of the multifocal display systems 340, 365 can be determined in accordance with the image decomposition method, described in further detail below with reference to FIGS. 3-6. The displays of the multifocal display systems 340, 365 may be full-color displays. In some embodiments, the pixels can be implemented as organic LEDs (OLEDs), micro-OLEDs, or any other light emitting diode. Each display in the multifocal display systems 340, 365 is moveable, such that an optical path distance from the eye 305 to that display is adjustable. This allows for variable focus image planes associated with different display planes. The optical path distance from the displays in multifocal display systems 340, 365 may be adjusted, e.g., via one or more positioners coupled to a controller (not shown in FIG. 3). In some embodiments, the optical path distance from the eye 305 to the displays in multifocal display systems 340, 365 may be adjusted by the controller in response to the measured accommodation of the eye 305 by the accommodation measurement system 375. In some embodiments, each display in the multifocal display systems 340, 365 is mounted on a motorized translation state that adjusts its focal distance. In some embodiments, a location of the display is adjusted in response to the measured accommodation of the corresponding eye 305, as determined by the accommodation measurement system 375.

Light emitting from all displays in the multifocal display system 340, 365 may be combined before being conveyed to the corresponding eye 305. In some embodiments, the light from the displays is combined using pellicle beamsplitters. In some embodiments, each display the multifocal display system 340, 365 is independently actuated and provides a depth of focus (DOF) with an extended range, allowing for correction for a user's corrective prescription. Thus, a user may view an image decomposed across the multifocal display systems 340, 365 without the use of corrective lenses. In some embodiments, the lateral distance between the multifocal display system 340 and the multifocal display system 365 may be adjusted to match the interpupillary distance of the eyes 305. As shown in FIG. 3, each of the multifocal display systems 340 and 365 include three separate displays, however in other embodiments the multifocal display systems 340 and 365 may contain any plurality of displays.

As shown in FIG. 3, the multifocal test system 300 further includes an eye-tracking system 310a, an eye-tracking system 310b, and an accommodation measurement system 375. The eye-tracking systems 310a, 310b determine gaze directions of the eyes 305. Each eye-tracking system 310a, 310b measures a gaze direction of a corresponding eye 305. In some embodiments, the eye-tracking systems 310a, 310b track the boundaries of the pupils of the eyes 305 using structured light emitted from a structured light source (not shown in FIG. 3). The light source may be implemented as an array of near-infrared (NIR) light-emitting diodes (LEDs) placed into a structure in front of each eye box of the eye 305. Each eye-tracking system 310, a 310b includes a sensor, e.g., an infrared camera, which collects infrared light reflected from the eye 305. The reflected light can be then analyzed to extract eye rotation from changes in the infrared light reflected by the eye 305. Note that hot mirrors 315 separate an optical path of the eye tracking system 310a, 310b from an optical path of the multi-focal display system 340, 365.

The accommodation measurement system 375 measures an accommodation of one of the eye 305 (e.g., the left eye) based on captured light that originates from the accommodation light source 370. In some embodiments, the accommodation of the eye 305 is measured using a Shack-Hartmann wavefront sensor integrated into the accommodation measurement system 375 (not shown in FIG. 3). Note that the accommodation light source 370 is separate from the light sources of the eye-tracking systems 310a, 310b, i.e., the accommodation illumination source 370 has its own optical path to the eye 305.

The light projected from the accommodation light source 370 onto the eye 305 enters the eye lens and is then scattered from the retina of the eye 305. In some embodiments, the accommodation illumination source 370 projects near-infrared light from a superluminescent diode (SLD) integrated into the accommodation illumination source 370, and the near-infrared light is coupled to the eye 305 after reflection from a weakly reflecting beam-splitter 380. The light scattered from the retina is collected by the accommodation measurement system 375, which converts changes in the scattered light to a measurement of the accommodation of the eye 305. The accommodation measurement system 375 includes a sensor (e.g., Shack-Hartmann wavefront sensor) that is tuned to the same wavelength of light emitted by the accommodation illumination source 370. In some embodiments, the light reflected from the retina of the eye 305 is separated from image light emitted from the multifocal displays 340 and 365 using a hot mirror 315. In some embodiments, the accommodation measurement system 375 includes a wavefront sensing camera which detects the light reflected from the retina of the eye 305. The wavefront sensing camera may be configured to detect a range of wavelengths that corresponds to a range of wavelengths of light emitted from the accommodation illumination source 370.

In accordance with embodiments of the present disclosure, an image (i.e., content) is decomposed over the multiple displays of each multifocal display system 340, 365.

The decomposed image may be rendered on the displays in real-time, as well as re-rendered in response to the gaze direction of the eyes 305 as measured by the eye-tracking systems 310a, 310b. The process and method of rendering an image on the multifocal display systems 340 and 365 is described in further detail below and with respect to FIGS. 4-6.

Before adjusting an image decomposition in response to a gaze direction and/or accommodation measurement, an image is initialized in the multifocal display systems 340, 365. Initialization entails determining an initial pixel intensity value for each of the pixels in the first display 325, second display 330, third display 335, fourth display 350, fifth display 355 and sixth display 360. Following initialization of the pixel intensity values, the pixel intensity values are adjusted in response to the gaze direction measured by the eye-tracking system 310a and 310b. These adjustments are described in further detail below and with reference to FIGS. 3-6. The equations that follow assume monochromatic images, however they can be applied to any number of color channels as necessary for the pixels within the multifocal display systems 340, 365.

The initial pixel intensity values are determined for each display plane positioned at distances $d_i$ from the user's eyes 305. The distances $d_i$ may correspond to the positions of the displays in the multifocal display system 340, 365. The distances are given as $d_i$ for $i \in \{1, \ldots, D\}$ where D is the total number of displays per eye. Thus, in the multifocal test system 300, D=3. A hypothetical focal stack of focal distances is defined as $f_i$ for $i \in \{1, \ldots, F\}$, where F is a total number of focal slices. The initial pixel intensity values are initialized to reflect the retinal defocus blur when a user's eyes are accommodated at each focal distance f. To solve for the initial pixel intensity values, the following matrix system is defined as the Euclidean norm $\|\cdot\|$:

$$\operatorname{argmin}_x \left\| \begin{pmatrix} K_{11} & \cdots & K_{1D} \\ \vdots & \ddots & \vdots \\ K_{F1} & \cdots & K_{FD} \end{pmatrix} \begin{pmatrix} x_1 \\ \vdots \\ x_D \end{pmatrix} - \begin{pmatrix} b_1 \\ \vdots \\ b_F \end{pmatrix} \right\|, \quad (1)$$

where $x_d \in \mathbb{R}^{N^2}$ are the unknown optimal pixel intensities for a given display d, assuming each display has a pixel resolution of N×N pixels, and $0 \leq x_i \leq 1$, $\forall i$. $K_{df} \in \mathbb{R}^{N^2 \times N^2}$ is the kernel sub-matrix for each focal slice f and display d, and the kernel matrix $K_{ij}$ includes all kernel sub-matrices as defined in equation (1). The vector $b_f \in \mathbb{R}^{N^2}$ is a vector of known pixel values of focal slice f. Each entry within a column of the kernel sub-matrix $K_{df}$ corresponds to an element of a discretized point spread function (PSF) of a given pixel on display d and onto focal slice f. The PSF of a given pixel represents a pixel kernel, which is a matrix, vector, or array of correlation values that "masks" a given pixel and is used to blur the pixel edges. The pixel kernels in part define the retinal defocus blur or focus of an image. A column of the kernel matrix K therefore represents the kernels of a single pixel displayed across the entire focal stack. To decompose an image across multiple displays having different focal distances, such as the displays of the multifocal display systems 340 and 365, the pixel intensity values $x_d \in \mathbb{R}^{N^2}$ are determined by solving the equation (1).

In some embodiments, the equation (1) can be solved using the normal equations:

$$(K^T K) x = K^T b, \quad (2)$$

where the unknown pixel intensity values $x_d \in \mathbb{R}^{N^2}$ comprise the vector x, and $b_f \in \mathbb{R}^{N^2}$ comprise the vector b. The term $(K^T K)$ can be expanded, becoming:

$$\begin{pmatrix} \sum K_{i1}^T K_{i1} & \cdots & \sum K_{i1}^T K_{iD} \\ \vdots & \ddots & \vdots \\ \sum K_{iD}^T K_{i1} & \cdots & \sum K_{iD}^T K_{iD} \end{pmatrix} = \begin{pmatrix} C_{11} & \cdots & C_{1D} \\ \vdots & \ddots & \vdots \\ C_{D1} & \cdots & C_{DD} \end{pmatrix} \quad (3)$$

where the term $K^T b$ of equation (2) can also be expanded as shown below:

$$\begin{pmatrix} \sum_{i=1}^{F} K_{i1}^T b_i \\ \vdots \\ \sum_{i=1}^{F} K_{iD}^T b_i \end{pmatrix} = \begin{pmatrix} r_i \\ \vdots \\ r_D \end{pmatrix} \quad (4)$$

Thus from equations (3) and (4), the equation (2) can be rewritten as:

$$Cx = r \quad (5)$$

where $C \in \mathbb{R}^{DN^2 \times DN^2}$ and $r \in \mathbb{R}^{DN^2}$. Since the columns of $K_{ij}$ are pixel kernels for a single focal slice, the $(a, b)^{th}$ pixel element of $C_{ij}$ corresponds to the sum of correlations of pixel a's kernel in display i and pixel b's kernel in display j. Similarly, the $a^{th}$ element of $r_i$ is the sum of the correlations of pixel a's kernel in display i with each focal slice. As rewritten in equation (5), the equation (2) becomes a discrete convolution of the displayed image with summed cross-correlated kernels, reducing the optimal decomposition problem of equations (1) and (2) to discrete deconvolution for the unknown pixel intensity values x of equation (5). These convolutions are solved within the primal domain as described below, rather than in a frequency or Fourier space.

To simplify the pixel kernels that make up both the matrix C and the vector r, two separate simplifying assumptions are made. In some embodiments, one or neither of these simplifications may be used. In other embodiments, other simplifying assumptions may be used to solve for x in equation (5).

The first assumption is that the PSF of a pixel, represented by the pixel kernels, uses a thin lens approximation, which is a model of the PSF of an object through a lens of negligible thickness and onto an image plane. The PSF model leads to circular, symmetric kernels. The second assumption is a small angle approximation, since the display and focal distances $d_i$ and $f_i$ are large compared to the user's pupil diameter $\phi$. Using both of these approximations and the PSF model leads to the following analytical equations: for focal slice f, the kernel k(p) of a pixel at position $p_0$ on a multifocal display d:

$$k(p) = \operatorname{circ}\left( (p - p_0) \left( \frac{\phi}{2} \right) |d - f| \right), \quad (6)$$

where p and $p_0$ are given in tangent angles, and the function circ(x) is defined as 1 inside a unit disk and 0 elsewhere. After rasterization over p, the kernels are normalized to have unit area.

In accordance with equation (6), all of the columns in the matrix $K_{ij}$ have the same structure, differing by a translation on the surface of their respective displays. Thus each submatrix within $K_{ij}$ can be replaced by a single image $\overline{K}_{df} \in \mathbb{R}^{N^2 \times N^2}$ of the kernel for the display's central pixel. The subsequent equations derived from equation (1) can thus also be rewritten in terms of the image $\overline{K}_{df}$, leading to new formulations of the matrix C as defined in equation (3) and vector r defined in equation (4). The matrix C becomes matrix $\overline{C}$:

$$\overline{C}_{ij} = \sum_{f=1}^{F} \overline{K}_{fi} * \overline{K}_{fj}, \quad (7)$$

and the vector r becomes $\bar{r}$:

$$\bar{r}_i = \left( \sum_{f=1}^{F} \overline{K}_{fi} \right) * b_i \quad (8)$$

These new formulations lead to a similar reformulation of equation (5) as:

$$\begin{pmatrix} \overline{C}_{11} & \cdots & \overline{C}_{1D} \\ \vdots & \ddots & \vdots \\ \overline{C}_{D1} & \cdots & \overline{C}_{DD} \end{pmatrix} * \begin{pmatrix} \bar{x}_1 \\ \vdots \\ \bar{x}_D \end{pmatrix} = \begin{pmatrix} \bar{r}_i \\ \vdots \\ \bar{r}_D \end{pmatrix} \quad (9)$$

Figure 7:
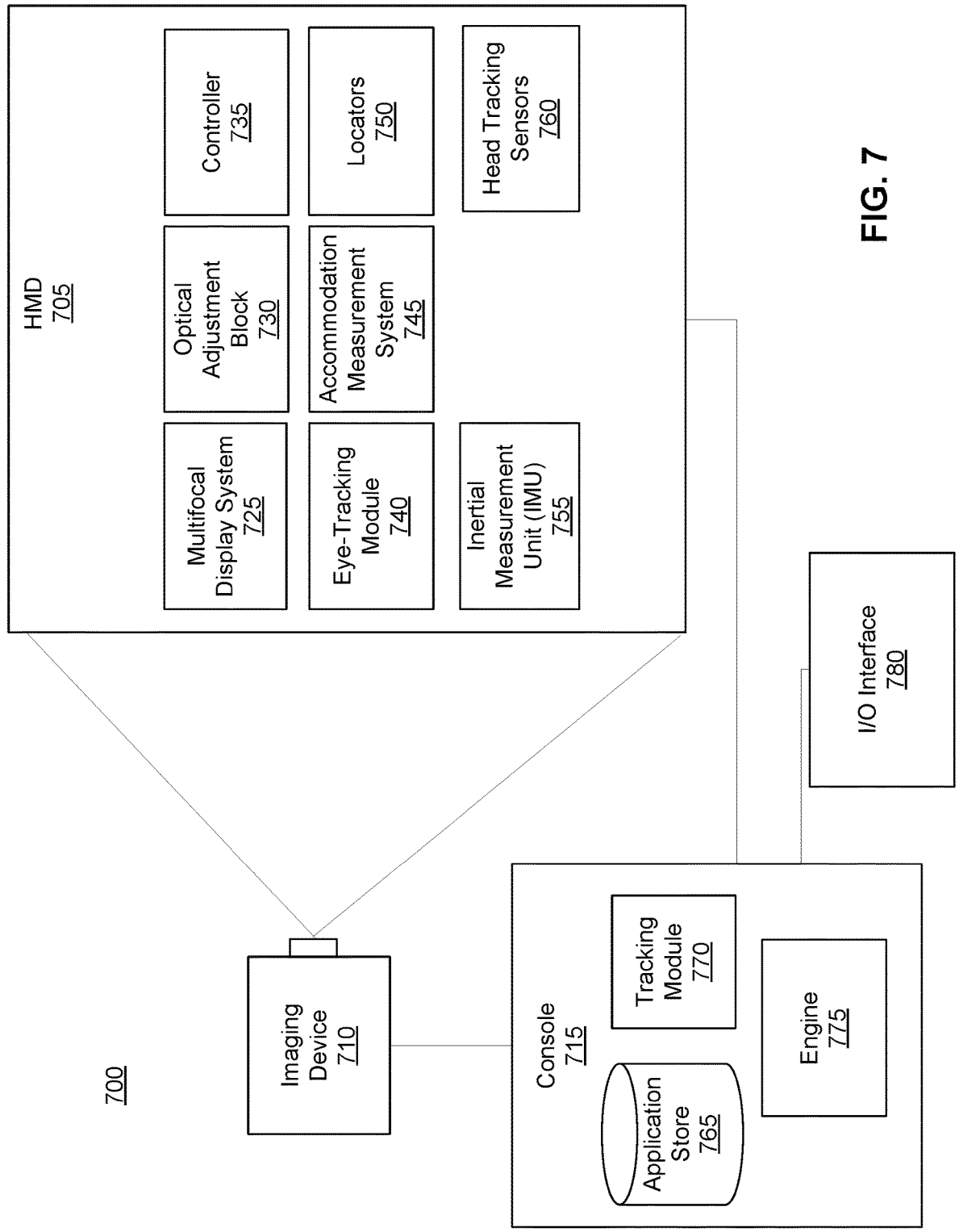
FIG. 7 is a block diagram of a HMD system in which a console operates, in accordance with one or more embodiments.

In some embodiments, the terms $$\overline{C}_{ij} \sum_{f=1}^{F} \overline{K}_{fi}$$

are precomputed and stored in a memory, such as the memory of a controller, e.g., the controller 735 described in further detail with respect to FIG. 7.

The equation (9) may be solved for the unknown pixel intensity values x using numerical approximation methods, such as through Jacobi iterations, or any other suitable numerical approximation. An example iterative Jacobi solution can be described as:

$$\bar{x}^{(k+1)} = (1-\alpha)\bar{x}^{(k)} + \alpha \lambda^{-1}(\bar{r} + \lambda \bar{x}^{(k)} - \overline{C}\bar{x}^{(k)}), \quad (10)$$

where $\lambda_d$ is defined as the scalar value of the central pixel of image $\overline{C}_{dd}$ and $\lambda^{-1} = (1/\lambda_1, \ldots, 1/\lambda_D)^T$, and $\alpha$ is a positive scalar. Given the approximate solution vector $\bar{x}^{(k)}$ obtained during the $k^{th}$ Jacobi iteration, the (k+1) iteration is defined in equation (10). The Jacobi iteration for $\bar{x}$ converges under the following condition:

$$0 < \alpha < 1 \bigg/ \left( \sum_{d=1}^{D} \left( \frac{F}{\lambda_d} \right) \right). \quad (11)$$

In some embodiments, the number of Jacobi iterations of equation (10) may be less than or equal to 100 iterations. In other embodiments, the number of Jacobi iterations of equation (10) may be less than or equal to 50 iterations. In general, any number of Jacobi iterations or numerical iterations may be computed to converge to a solution of $\bar{x}$.

In some embodiments, the method and equations described above may be modified using the user's gaze direction as determined by the eye-tracking systems 310a, 310b and/or the accommodation measurement of the user's eye 305 as determined by the accommodation measurement system 375. These modifications are described in further detail with reference to FIGS. 4-6.

Figure 4:
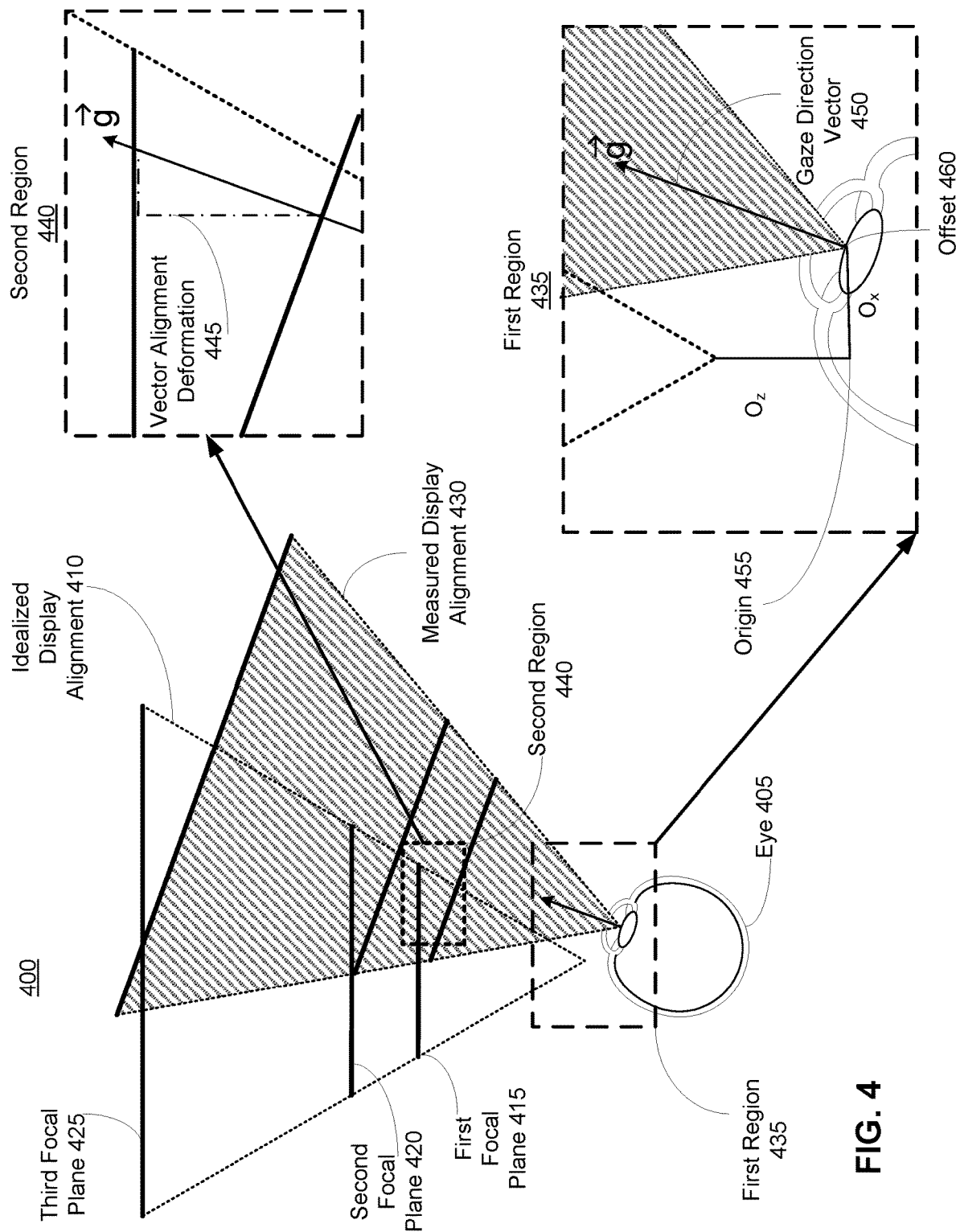
FIG. 4 is an example of eye alignment deformations in a multifocal system, in accordance with one or more embodiment.

FIG. 4 is an example of eye alignment deformations 400 in a multifocal system, in accordance with one or more embodiments. The multifocal system may be the multifocal system 300 of FIG. 3. An eye 405 represents a single eye of a user viewing the multifocal system. The eye 405 views the multifocal system through an idealized display alignment 410. It is considered for the idealized alignment 410 that a user's gaze is perpendicular to the displays of the multifocal system. The displays within the multifocal display system include first focal plane 415, second focal plane 420, and third focal plane 425. In some embodiments, the displays within the multifocal display system may correspond to the displays within multifocal display systems 340 and/or multifocal display system 365. In some embodiments, the first focal plane 415 may correspond to the first display 325, the second focal plane 420 may correspond to the second display 330, the third focal plane 425 may correspond to the third display 335. The measured display alignment 430 shown in FIG. 4 is the true alignment of the eye 405 with the focal planes in the idealized display alignment 410. The measured display alignment 430 may be measured through an eye-tracking system, such as the eye-tracking system 310a, 310b of FIG. 3. The measured display alignment 430 leads to deformations in the alignment of the eye 405 with respect to the idealized display alignment 410. These deformations are shown in more detail in the first region 435 and second region 440.

The first region 435 shows the gaze direction vector 450, which is the direction perpendicular from the center of the eye 405. The first region 435 also shows the offset 460, which is the lateral distance between the center point of a user's eye 405 and the idealized origin 455 corresponding to the idealized display alignment 410. Thus, the movement of the eye 405 out of the idealized display alignment 410 leads to two separate alignment deformations: the vector alignment deformation 445 and the offset 460. In the second region 440, the vector alignment deformation 445 results from the difference between the idealized display alignment 410 and the user's measured display alignment 430. This creates a rotation from the idealized display alignment 410 to the measured display alignment 430 along the direction of the gaze direction vector 450.

To correct for both the vector alignment deformation 445 and the offset 460, the aforementioned scene decomposition method is modified as discussed below. The correction essentially represents an image deformation mapping of the idealized display alignment 410 that would otherwise be rendered in accordance to the aforementioned scene decomposition method to the measured display alignment 430, which is measured in real time using an eye-tracking system.

The mapping between each pixel in the idealized display alignment 410 to the measured display alignment 430 can be solved explicitly. Any mapping algorithm capable of mapping between the idealized display alignment 410 to the measured display alignment 430 may be used. An example mapping is described below. Defining the vectors $n = (n_x, n_y)^T \in [-1, 1]^2$ as the normalized coordinate of a pixel in the idealized display alignment 410, $g = (g_x, g_y, g_z)^T$ as the gaze direction vector 450 and $o=(o_x, o_y, o_z)^T$ as the offset 460, then the mapping from a pixel to the decomposed image in alignment with the gaze direction vector 450 is defined as:

$$n \mapsto \frac{M_1 n + v_1}{M_2 n + v_2}, \tag{12}$$

where $M_1, M_2 \in \mathbb{R}^{2 \times 2}$ and $v_1, v_2 \in \mathbb{R}^2$ are defined as:

$$M_1 = \begin{pmatrix} dg_z t_x & 0 \\ -dg_x g_y t_x & dt_y(1-g_y^2) \end{pmatrix} \tag{13}$$

$$M_2 = \begin{pmatrix} -t_x^2 \sqrt{1-g_y^2}\, dg_x & -t_x t_y \sqrt{1-g_y^2}\, dg_y \\ -t_y t_x \sqrt{1-g_y^2}\, dg_x & -t_y^2 \sqrt{1-g_y^2}\, dg_y \end{pmatrix}$$

$$v_1 = \begin{pmatrix} (d+o_z)g_x - g_z o_x \\ g_x g_y o_x - o_y(1-g_y^2) + (d+o_z)g_y g_z \end{pmatrix}$$

$$v_2 = \begin{pmatrix} t_x \sqrt{1-g_y^2}\,(dg_z + o \cdot g) \\ t_y \sqrt{1-g_y^2}\,(dg_z + o \cdot g) \end{pmatrix},$$

where the vector t is defined as:

$$(t_x, t_y) = \left(\tan\left(\frac{fov_x}{2}\right), \tan\left(\frac{fov_y}{2}\right)\right), \tag{14}$$

where $fov_x$ and $fov_y$ are the horizontal and vertical field-of-view angles, respectively. Displaying images with the mapping defined by equations (12)-(14) solves the display misalignment of the vector alignment deformation 445 and the offset 460, as shown in FIG. 4. The mapping described above can be applied to the image decomposition method described above. More details about the mapping is described in further detail with reference to FIG. 6.

Figure 5:
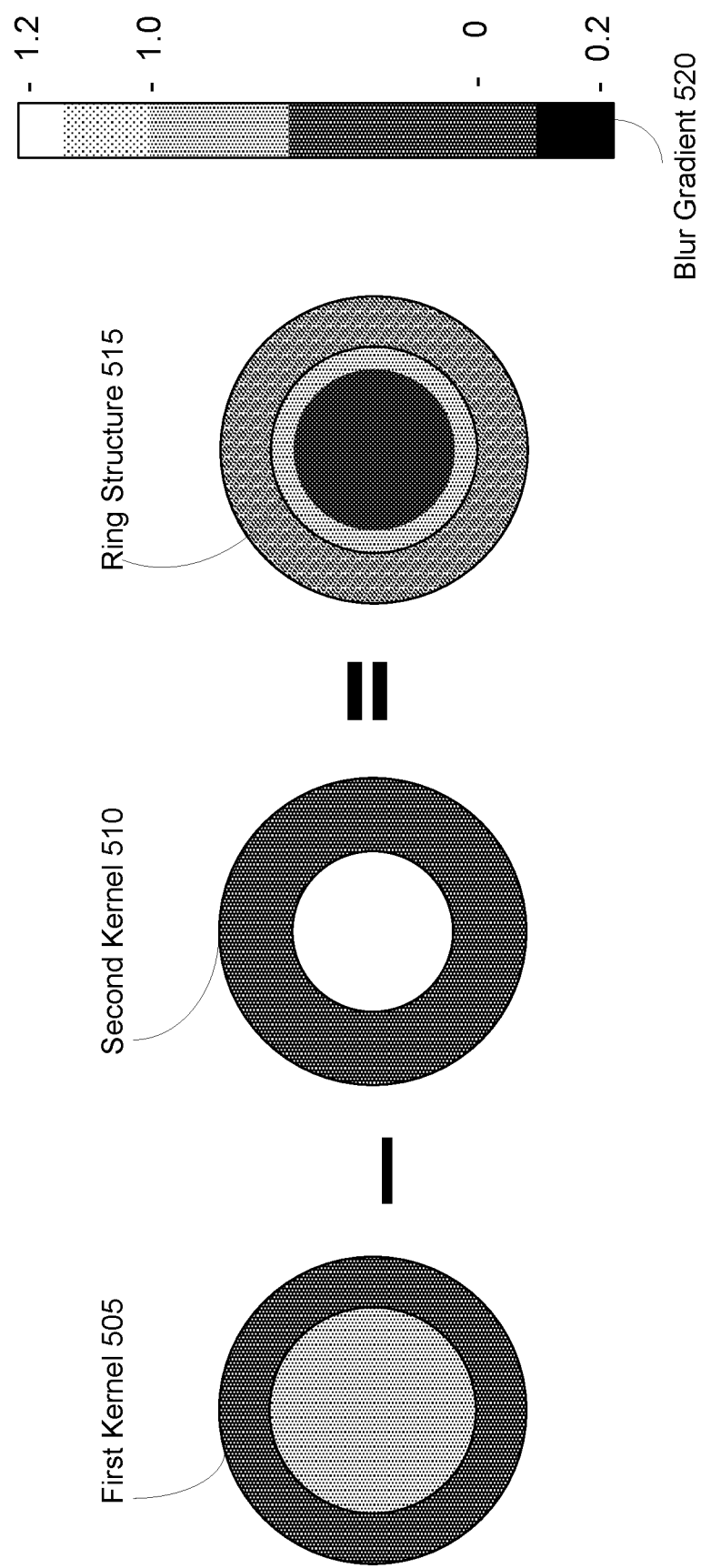
FIG. 5 is an illustration of blur gradient kernels, in accordance with one or more embodiments.

FIG. 5 is an illustration of blur gradient kernels 500, in accordance with one or more embodiments. The blur gradient kernels 500 accelerate the formation of ring structures around depth discontinuities that arise through the Jacobi iterations of equation (10). The ring structures are outlines around depth discontinuities that are rendered at a focal distance different from the focal distance on either side of the discontinuity. The ring features improve correct blur cues for a single pixel across a whole focal stack. Changes in blur gradients at locations in an image that have changes in depth (such as at edges of an object) improve the accommodation response of a user's eye. However it may take many iterations of equation (10) to achieve the desired ring structures. Using the blur gradient kernels 500, the ring structures, such as ring structure 515, form using fewer Jacobi iterations, thus reducing the computation time for multifocal image decomposition.

To achieve the ring structure 515, the following modifications may be made to the scene decomposition method described above. To force the ring structure 515 to form faster, a gradient in depth can be approximated as finite differences by subtracting adjacent focal slices in a pixel's focal stack, such as first kernel 505 and second kernel 510. The gradient term is added to equation (1) as shown below:

$$\operatorname{argmin}_x \|Kx - b\| + \beta \|K'x - b'\|, \tag{15}$$

where β weights the contributions of the blur gradient term, and defining K' and b' as:

$$K' := \begin{pmatrix} K'_{11} & \cdots & K'_{1D} \\ \vdots & \ddots & \vdots \\ K'_{F1} & \cdots & K'_{FD} \end{pmatrix}, K'_{d,f} := K_{d,f+1} - K_{d,f} \tag{16}$$

$$b' := \begin{pmatrix} b'_1 \\ \vdots \\ b'_F \end{pmatrix}, b'_f := b_{f+1} - b_f. \tag{17}$$

The terms used to construct K' and b' are obtained by reusing the K and b terms in a previously computed focal stack, thus the computation time for K' and b' do not represent any significant additional cost. The minimization requirements for equation (15) lead to the normal equations:

$$(K^T K + \beta K'^T K')x = (K^T b + \beta K'^T b') \tag{18}$$

The normal equations can be simplified using the kernel equations (6)-(9), resulting in a modification of the Jacobi iterations of equation (10) to solve for the unknown pixel intensity values x.

While the blur gradient kernel 500 are useful for improving accommodation, the normal equations of equation (18) cannot be solved using Jacobi iterations, since some kernels may be non-negative, violating the convergence criterion of equation (11). Thus, only a few Jacobi iterations using the blur gradient equations are computed, before reverting back to the Jacobi iterations of equation (10), which converge and result in the pixel intensity values x. This is described in further detail with reference to FIG. 6.

An example of the blur gradient kernel 500 is shown in FIG. 5. The first kernel 505 corresponds to the term $K_{d,f+1}$ in equation (16), while the second kernel 510 corresponds to the term $K_{d,f}$. Thus, the first kernel 505 is the kernel mask of a pixel at focal length f+1 in the focal stack, while the second kernel 510 is the kernel mask of a pixel at focal length f in the focal stack. The resulting blur gradient kernel has the desired ring structure 515 which helps the eye distinguish a change in focal depth between a focal length at ~−0.2 and one at 0, as shown in FIG. 5.

Figure 6:
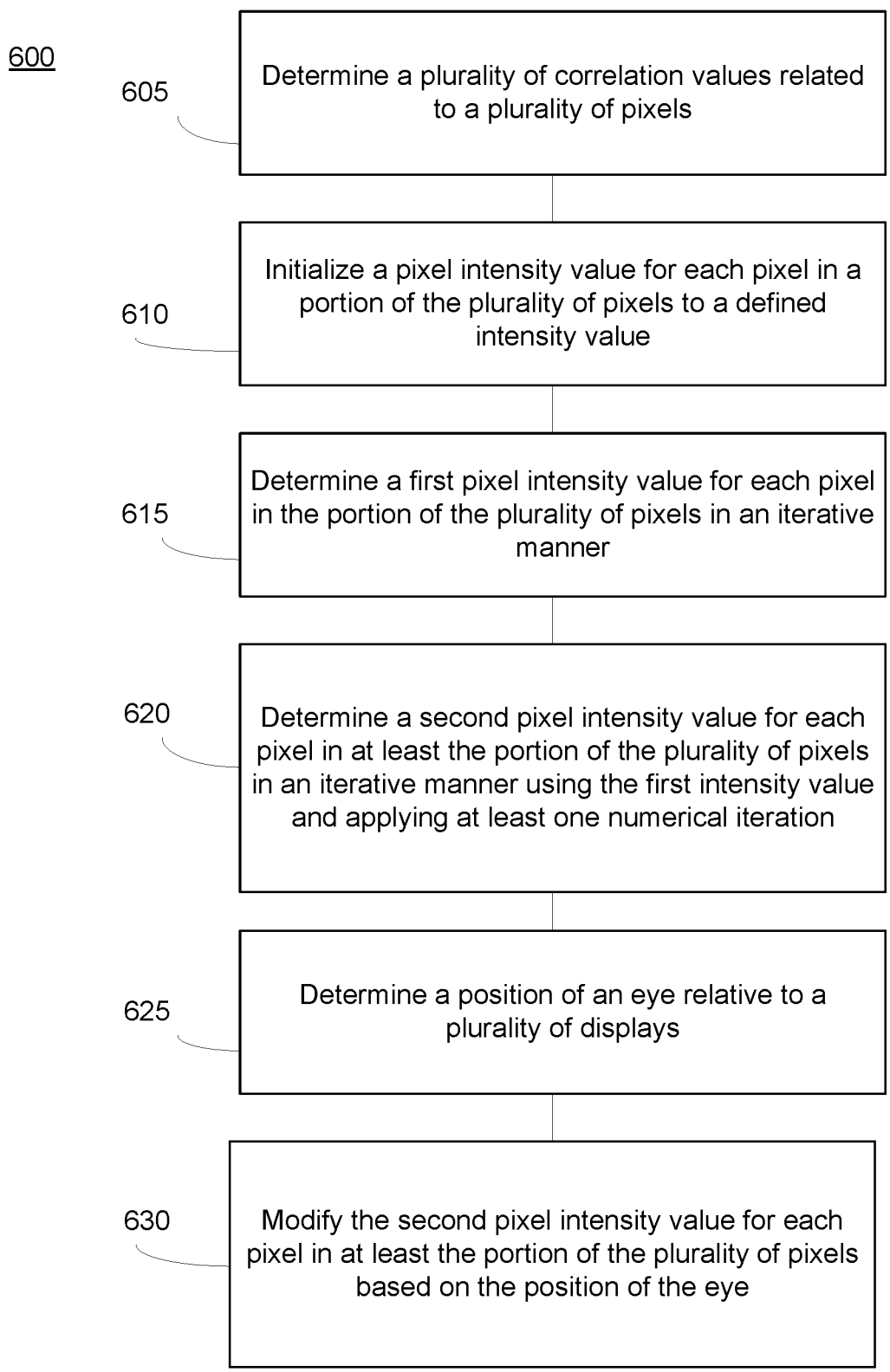
FIG. 6 is a flow chart of a method for determining a decomposition of an image in a multifocal system, in accordance with one or more embodiments.

FIG. 6 is a flow chart of a method 600 for determining a decomposition of an image in a multifocal display system, in accordance with one or more embodiments. The method 600 may be used to decompose, e.g., an image in the multifocal display system 215 of the HMD 200, the multifocal test system 300, and/or the multifocal system 700 described in FIG. 7. Operations of the method 600 may be carried out by components of the HMD 200, components of the multifocal test system 300, and/or components of the HMD system 705 in FIG. 7. The method 600 results in the determination of pixel intensity values, which are then used to display an image in a multifocal system.

The system determines 605 a plurality of correlation values related to a plurality of pixels. In some embodiments, the correlation values are the focal stack of kernels that make up the vector r in equation (4). In some embodiments, using the aforementioned thin lens and small angle approximations for simplifying the kernel values, the plurality of correlation values are the focal stack of kernels that make up the vector f in equations (8)-(10). In some embodiments, the system determines 605 the plurality of correlation values by solving equation (4) for the kernel values across a focal stack of a multifocal system for each pixel in the display. In other embodiments, the system determines 605 the plurality of kernels by solving equation (8) for the kernel values across a focal stack of a multifocal system for each pixel in the display. The plurality of pixels may be the pixels within a multifocal display system. The plurality of correlation values may be precomputed in whole or in part, such that determining the plurality of correlation values at 605 entails accessing kernel values stored in a memory of the system.

The system initializes 610 a pixel intensity value for each pixel in a portion of the plurality of pixels to a defined intensity value. In some embodiments, the defined intensity value is 0. Initializing the pixel intensity values inputs initial values into a numerical equation for optimal pixel intensity values. Thus, the system initializes 610 the values of $\bar{x}$ to 0 in the Jacobi iteration of equation (10). In some embodiments, the system initializes 610 the pixel intensity values of all of the pixels in a display of a multifocal system. Alternatively, the system initializes a portion of the total number of pixels in a display of a multifocal system, such as the portion corresponding to pixels within a field of view of a user's eye.

The system determines 615 a first pixel intensity value for each pixel in the portion of the plurality of pixels in an iterative manner. In some embodiments, the system determines 615 the first pixel intensity value by computing a pixel intensity value for that pixel following one Jacobi step of equation (10) using the blur gradient formulation described in further detail with reference to FIG. 5. Thus, the first pixel intensity value can be computed using one or more Jacobi iterations to solve equation (18). The number of Jacobi steps at 615 using the blur gradient formulation described with reference to FIG. 5 may be in a range from one to 10,000 steps.

The system determines 620 a second pixel intensity value for each pixel in at least the portion of the plurality of pixels in an iterative manner using the first intensity value and applying at least one numerical iteration. In some embodiments, the system determines 620 a second pixel intensity value by computing the second pixel intensity value using the result of the blur gradient Jacobi iterations at step 615. The step 620 may entail any number of Jacobi iterations of equation (10). The number of Jacobi iterations at 620 may be equal to a number of iterations necessary for convergence of the pixel intensity values. In some embodiments, the number of Jacobi iterations at 620 is less than or equal to 100. In other embodiments, the number of Jacobi iterations at 620 may be less than or equal to 50. Alternatively, any numerical, iterative method of solving the normal equations that result from equation (9) may be used.

The system determines 625 (e.g., via an eye tracking system) a position of an eye relative to a plurality of displays. In some embodiments, the system determines 625 the position of the eye by measuring the gaze direction vector 450 and the offset 460. The gaze direction vector 450 and the offset 460 may be measured by an eye-tracker system, such as the eye-tracking system 205 in FIG. 2, the eye-tracking systems 310a and 310b in FIG. 3, and/or the eye-tracking module 740 in FIG. 7. The plurality of displays may be the plurality of displays in a multifocal display system, such as the multifocal display system 210 in FIG. 2, the multifocal display systems 340 and 365, and/or the multifocal display system 725.

The system modifies 630 the second pixel intensity value for each pixel in at least a portion of the plurality of pixels based on the position of the eye. In some embodiments, the system modifies 630 the second pixel intensity value based on a transformation mapping of the second pixel intensity value determined at 620 to the display orientation measured at 625. In some embodiments, the system modifies 630 the second pixel intensity value by computing the transformation of equation (12) using equations (13)-(14). Any other transformation mapping equation may be used at 630 to modify the previously rendered focal stack computed at 625 to reflect the vector alignment deformation 445 and the offset 460 as described in further detail with reference to FIG. 4. Following 630, the system computes a full focal stack of pixel intensity values for at least a portion of the pixels in a multifocal display that reflect the alignment of user's eyes with the display planes of the multifocal display system.

FIG. 7 is a block diagram of a HMD system in which a console operates, in accordance with one or more embodiments. The multifocal system may be implemented on the multifocal system 300 as shown in FIG. 3. In some embodiments, the multifocal system 700 operates in an augmented reality system. The multifocal system 700 shown by FIG. 7 comprises an HMD 705 and an input/output (I/O) interface 780 that are communicatively coupled to a console 715. The HMD 705 may be the HMD 200 as described in FIG. 2. While FIG. 7 shows an example multifocal system 700 including one HMD 705 and an I/O interface 780, in other embodiments, any number of these components may be included in the multifocal system 700. For example, there may be multiple HMDs 705 each having an associated I/O interface 780, with each HMD 705 and I/O interface 780 communicating with the console 715. In alternative configurations, different and/or additional components may be included in the multifocal system 700. Additionally, functionality described in conjunction with one or more of the components shown in FIG. 7 may be distributed among the components in a different manner than described in conjunction with FIG. 7 in some embodiments. For example, some or all of the functionality of the console 715 is provided by the HMD 705 or vice versa.

The HMD 705 presents content to a user. Example content includes images, video, audio, or some combination thereof. Audio content may be presented via a separate device (e.g., speakers and/or headphones) external to the HMD 705 that receives audio information from HMD 705, console 715, or both. The HMD 705 includes a multifocal display system 725, an optical adjustment block 730, a controller 735, an eye-tracking module 740, an accommodation measurement system 745, a plurality of locators 750, an internal measurement unit (IMU) 255, and head tracking sensors 760. In some embodiments, the HMD 705 may also or alternatively act as an augmented reality (AR) and/or mixed reality (MR) HMD. In these embodiments, the HMD 705 augments views of a physical, real-world environment with computer-generated elements (e.g., images, video, sound, etc.).

The multifocal display system 725 generates image light. The multifocal display system 725 includes a plurality of display panels for each eye of the user. The multifocal display system 725 may be the multifocal display system 340 and/or multifocal display system 365 of FIG. 3. There are a plurality of display panels that may emit image light for a left eye channel (i.e., optical path from an electronic display panel to an eye-box for a left eye), and there are a plurality of display panels that may emit image light for a right eye channel (i.e., optical path from an electronic display panel to an eye-box for a right eye). For a given eye channel, there are a plurality of display panels that are located at different variable positions such that each display panel is associated with a different range of focal distances (i.e., light from each display panel would be imaged at different locations). Additionally, in some embodiments, some or all of the electronic display panels may be adjusted within their corresponding variable position. This may allow for fine adjustment of focal distance, where gross adjustment could be handled by changing which of the electronic displays emit the image light.

The multifocal display system 725 may do fine adjustment of positions of one or more electronic display panels in accordance with the measured user accommodation determined by the accommodation measurement system 745. One or more of the electronic display panels are situated on moveable stages that have at least one degree of freedom of movement (adjust along one axis) and up to six degrees of freedom of movement (e.g., x, y, z, pitch, yaw, roll). The positional information for each electronic display panels corresponds to a particular state of the multifocal display system 725. Accordingly, the multifocal display system 725 may have a plurality of states that each correspond to different position configurations of electronic display panels. And each specific position of an electronic display panel has a corresponding focal distance (e.g., virtual image plane) at which images are presented to the user. In some embodiments, one or both eye channels may include a plurality of electronic display panels that are positioned such their corresponding virtual image planes are offset in diopters.

For example, a left eye channel may include a first electronic display panel and a second electronic display panel that are located, respectively, in a first position and a second position. Additionally, the first electronic display panel and/or the second electronic display panel may adjust its position within their respective variable positions in accordance with varifocal instructions. For example, the first electronic display panel can adjust its position such that it can occupy any position within 2.0 to 2.5 cm.

The electronic display panels may be, e.g., a liquid crystal display (LCD), an organic light emitting diode (OLED) display, an active-matrix organic light-emitting diode display (AMOLED), a transparent OLED (TOLED), some type of flexible display, or some combination thereof. In some embodiments, the electronic display panels include a polarizer or emit light that is polarized.

The optical adjustment block 730 adjusts image light being presented to a user of the HMD 705. The adjusted image light may be, e.g., displaying the image light at different focal positions to, e.g., mitigate vergence-accommodation conflict and/or adjusting the image light to correct for one or more aberrations that would otherwise be introduced by the eyes of the user.

The optical adjustment block 730 corrects for aberrations using one or more error compensation systems. An error compensation system measures one or more optical aberrations and compensates for the aberrations by modifying the image light presented to the user. An error compensation system includes one or more illumination sources, one or more wavefront sensors, and one or more adaptive optical elements. The one or more illumination sources generate an infrared test wavefront that is projected onto one or both eyes of a user. An illuminated eye reflects the infrared test wavefront, the reflected test wavefront includes aberrations caused by the eye. The reflected test wavefront is directed to a wavefront sensor. The wavefront sensor determines distortion in the reflected test wavefront. The wavefront sensor generates compensation instructions using the reflected test wavefront. Compensation instructions are instructions that the one or more adaptive optical elements use to compensate for one or more optical aberrations. The wavefront sensor provides the compensation instructions to one or more adaptive optical elements (e.g., one in an optical path for each eye).

An adaptive optical element modifies light emitted from one or more electronic display panels in accordance with the compensation instructions. The modified light corrects for one or more forms of optical aberration. The adaptive optical element may be, e.g., a deformable mirror, a spatial light modulator, some other optical device that can modify the wavefront of light, or some combination thereof. The one or more aberrations may be those present in a user's eye and/or the HMD 705. The one or more aberrations may include, for example, astigmatism, field curvature, or some combination of any of these and any other optical point aberration thereof. The adaptive optical element is placed in the optical path between the plurality of displays and the user's eye. The adaptive optical element receives compensation instructions from the wavefront sensor, and modifies light emitted from one or more electronic display panels in accordance with the compensation instructions. The modified light is pre-distorted to mitigate (i.e., offset) the distortion identified by the wavefront sensor. For example, the compensation instructions may instruct the adaptive optical element to remove optical power to offset for myopia in a user's eye detected by the wavefront sensor. In addition, the instructions may also include an offset to account for non-common path aberrations between the wavefront sensor and the display.

The controller 735 may be configured to perform one or more operations in relation to determining a decomposition of an image in a multifocal display system. For example, the controller 735 may be configured to perform one or more operations of the method 600. The controller 735 may be coupled to the multifocal display system 725 and the eye-tracking module 740. In some embodiments, the controller 735 is separate from the multifocal display system 725. In other embodiments, the controller 735 is integrated into the multifocal display system 725. The controller 735 may determine a plurality of correlation values related to a plurality of pixels of a plurality of displays in the multifocal display system 725. The controller 735 may initialize a pixel intensity value for each pixel in at least a portion of the plurality of pixels to a defined intensity value, e.g. zero. The controller 735 may determine a first pixel intensity value for each pixel in at least the portion of the plurality of pixels in an iterative manner by modifying the defined intensity value using at least one numerical iteration applied on blur gradient correlation values obtained based on the plurality of correlation values. The controller 735 may determine a second pixel intensity value for each pixel in at least the portion of the plurality of pixels in an iterative manner using the first intensity value and applying at least one numerical iteration. The eye-tracking module 740 may determine eye tracking information about a position of the eye relative to the plurality of displays of the multifocal display system 725. The controller may be configured to receive the eye tracking information from the eye-tracking module 740. The controller 735 may modify the second pixel intensity value for each pixel in at least the portion of the plurality of pixels based on the eye tracking information to determine a pixel intensity value for each pixel in at least the portion of the plurality of pixels. The controller 735 may instruct the plurality of displays of the multifocal display system 725 to display an image across the plurality of displays based on the determined pixel intensity value for each pixel in at least the portion of the plurality of pixels. In some embodiments, the controller 735 receives (e.g., from the accommodation measurement system 745 coupled to the controller 735) information about an accommodation of the eye responsive to displaying the image across the plurality of displays based on the determined pixel intensity value for each pixel in at least the portion of the plurality of pixels. The controller 735 may modify the eye tracking information, based in part on the received information about the accommodation of the eye.

Eye-tracking module 740 tracks an eye position and eye movement of a user of HMD 705. The eye-tracking module 740 may be comprised of the eye-tracking system 310a and/or 310b of FIG. 3. A camera or other optical sensor inside the HMD 705 captures image information of a user's eyes, and the eye-tracking module 740 uses the captured information to determine eye-tracking information. Eye-tracking information is information relating to an orientation of one or both of a user's eyes. Eye-tracking information may include, e.g., interpupillary distance, interocular distance, a three-dimensional (3D) position of each eye relative to the HMD 705 (e.g., for distortion and parallax adjustment purposes), including a magnitude of torsion and rotation (i.e., roll, pitch, and yaw) gaze directions for each eye, some other information relating to a position of a user's eye, or some combination thereof. In one example, infrared light is emitted within the HMD 705 and reflected from each eye. The reflected light is received or detected by the camera and analyzed to extract eye rotation from changes in the infrared light reflected by each eye. Many methods for tracking the eyes of a user can be used by the eye-tracking module 740. Accordingly, the eye-tracking module 740 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye-tracking module 740 integrates information from past measurements, measurements identifying a position of a user's head, and 3D information describing a scene presented by the multifocal display system 725. Thus, information for the position and orientation of the user's eyes is used to determine the gaze point in a virtual scene presented by the HMD 705 where the user is looking.

The accommodation measurement system 745 measures an accommodation of a user's eyes. The accommodation measurement system 745 may be representation of the accommodation measurement system 375 of FIG. 3. The accommodation measurement system 745 may include a wavefront sensor, such as a camera, and a separate accommodation illumination light source. The wavefront sensor measures accommodation of the user's eye front light reflected off of a user's retina.

The locators 750 are objects located in specific positions on the HMD 705 relative to one another and relative to a specific reference point on the multifocal system 700. The locators 750 may be a light emitting diode (LED), a corner cube reflector, a reflective marker, a type of light source that contrasts with an environment in which the HMD 705 operates, or some combination thereof. In some embodiments the locators 750 are active, e.g., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The locators 750 can be located beneath an outer surface of the multifocal system 700, which is transparent to the wavelengths of light emitted or reflected by locators 750 or is thin enough not to substantially attenuate the wavelengths of light emitted or reflected by the locators 750. Further, the outer surface or other portions of the HMD 705 can be opaque in the visible band of wavelengths of light. Thus, the locators 750 may emit light in the IR band while under an outer surface of the HMD 705 that is transparent in the IR band but opaque in the visible band.

The IMU 750 is an electronic device that generates fast calibration data based on measurement signals received from a plurality of head tracking sensors 760, which generate a plurality of measurement signals in response to motion of the HMD 705. Examples of the head tracking sensors 760 include accelerometers, gyroscopes, magnetometers, other sensors suitable for detecting motion, correcting error associated with the IMU 755, or some combination thereof. The head tracking sensors 760 may be located external to the IMU 755, internal to the IMU 755, or some combination thereof.

Based on the measurement signals from the head tracking sensors 760, the IMU 755 generates fast calibration data indicating an estimated position of the HMD 705 relative to an initial position of the HMD 705. For example, the head tracking sensors 760 include multiple accelerometers to measure translational motion (forward/back, up/down, left/right) and multiple gyroscopes to measure rotational motion (e.g., pitch, yaw, and roll). The IMU 755 can, for example, rapidly sample the measurement signals and calculate the estimated position of the HMD 705 from the sampled data. For example, the IMU 755 integrates measurement signals received from the accelerometers over time to estimate a velocity vector and integrates the velocity vector over time to determine an estimated position of a reference point on the HMD 705. The reference point is a point that may be used to describe the position of the HMD 705. While the reference point may generally be defined as a point in space, in various embodiments, reference point is defined as a point within the HMD 705 (e.g., a center of the IMU 755). Alternatively, the IMU 755 provides the sampled measurement signals to the console 715, which determines the fast calibration data.

The IMU 755 can additionally receive a plurality of calibration parameters from the console 715. As further discussed below, the plurality of calibration parameters are used to maintain tracking of the HMD 705. Based on a received calibration parameter, the IMU 755 may adjust a plurality of IMU parameters (e.g., sample rate). In some embodiments, certain calibration parameters cause the IMU 755 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The I/O interface 780 is a device that allows a user to send action requests to the console 715. An action request is a request to perform a particular action. For example, an action request may be to start or end an application or to perform a particular action within the application. The I/O interface 780 may include a plurality of input devices. Example input devices include a keyboard, a mouse, a game controller, or any other suitable device for receiving action requests and communicating the received action requests to the console 715. An action request received by the I/O interface 780 is communicated to the console 715, which performs an action corresponding to the action request. In some embodiments, the I/O interface 780 may provide haptic feedback to the user in accordance with instructions received from the console 715. For example, haptic feedback is provided by the I/O interface 780 when an action request is received, or the console 715 communicates instructions to the I/O interface 780 causing the I/O interface 780 to generate haptic feedback when the console 715 performs an action.

The console 715 provides content to the HMD 705 for presentation to the user in accordance with information received from the HMD 705, or the I/O interface 780. In the example shown in FIG. 7, the console 715 includes an application store 765, a tracking module 770, and an engine 775. Some embodiments of the console 715 have different or additional modules than those described in conjunction with FIG. 7. Similarly, the functions further described below may be distributed among components of the console 715 in a different manner than is described here.

Application store 765 stores a plurality of applications for execution by the console 715. An application is a group of instructions, that when executed by a processor, generates content for presentation to the user. Content generated by an application may be in response to inputs received from the user via movement of the HMD 705 or the I/O interface 780. Examples of applications include gaming applications, conferencing applications, video playback application, or other suitable applications.

Tracking module 770 calibrates the VR system using a plurality of calibration parameters and may adjust a plurality of calibration parameters to reduce error in determining position of the HMD 705. For example, the tracking module 770 adjusts the focus of the imaging device 710 to obtain a more accurate position for the observed locators 750 on the HMD 705. Moreover, calibration performed by the tracking module 740 also accounts for information received from the IMU 755. Additionally, if tracking of the HMD 705 is lost (e.g., imaging device 710 loses line of sight of at least a threshold number of locators 750), the tracking module 770 re-calibrates some or all of the VR system components.

Additionally, the tracking module 770 tracks the movement of the HMD 705 using slow calibration information from the imaging device 710 and determines positions of a reference point on the HMD 705 using observed locators from the slow calibration information and a model of the HMD 705. The tracking module 770 also determines positions of the reference point on the HMD 705 using position information from the fast calibration information from the IMU 755 on the HMD 705. Additionally, the tracking module 770 may use portions of the fast calibration information, the slow calibration information, or some combination thereof, to predict a future location of the HMD 705, which is provided to an engine 775.

The engine 775 executes applications within the varifocal system 700 and receives position information, acceleration information, velocity information, predicted future positions, or some combination thereof for the HMD 705 from the tracking module 770. Based on the received information, the engine 775 determines content to provide to the HMD 705 for presentation to the user, such as a virtual scene. For example, if the received information indicates that the user has looked to the left, the engine 775 generates content for the HMD 705 that tracks the user's movement in a virtual environment. Additionally, the engine 775 performs an action within an application executing on the console 715 in response to an action request received from the I/O interface 780 and provides feedback to the user that the action was performed. The provided feedback may be visual or audible feedback via the HMD 705 or haptic feedback via the I/O interface 780.

In some embodiments, based on the eye tracking information (e.g., orientation of the user's eye) received from the eye-tracking system 740, the engine 775 determines resolution of the content provided to the HMD 705 for presentation to the user on one or more electronic panels of the multifocal display system 725. The engine 775 provides the content to the HMD 705 having a maximum pixel density (maximum resolution) on the one or more electronic display panels in a foveal region of the user's gaze, whereas the engine 775 provides a lower pixel resolution in other regions of the one or more electronic display panels, thus achieving less power consumption at the HMD 705 and saving computing cycles of the console 715 without compromising a visual experience of the user.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A controller configured to:
   obtain information about a gaze direction for an eye; and
   determine a pixel intensity value for at least one pixel in a portion of a plurality of pixels of a plurality of displays to generate content for presentation, based at least in part on the information about the gaze direction and decomposition of a scene related to the content displayed across the plurality of displays.

2. The controller of claim 1, wherein the information about the gaze direction includes at least one of: a vector gaze direction of the eye, and a distance between a center point of the eye and an origin point perpendicular to a center of a display of the plurality of displays.

3. The controller of claim 2, wherein the controller is further configured to adjust the pixel intensity value based on the distance and the vector gaze direction.

4. The controller of claim 1, wherein the controller is further configured to:
   determine at least one kernel for the at least one pixel based in part on an initial pixel intensity for the at least one pixel; and
   determine the pixel intensity value for the at least one pixel based in part on the at least one kernel.

5. The controller of claim 1, wherein at least two of the displays are located at a different focal distance from one another.

6. The controller of claim 1, wherein an optical distance between the eye and at least one display in the plurality of displays is adjustable, and the controller is further configured to change the optical distance based on a measured accommodation of the eye.

7. The controller of claim 1, wherein the controller is further configured to:
   determine information about an accommodation of the eye responsive to decomposition of the scene related to the content displayed across the plurality of displays, based on the determined pixel intensity value for each pixel in at least the portion of the plurality of pixels; and
   modify the information about the gaze direction based in part on the determined information about the accommodation of the eye.

8. The controller of claim 1, wherein the controller is further configured to:
   determine a plurality of correlation values related to the plurality of pixels of the plurality of displays;
   determine a first pixel intensity value for the at least one pixel by modifying an initial pixel intensity value for the at least one pixel using at least one numerical iteration applied on blur gradient correlation values obtained based on the plurality of correlation values;
   determine a second pixel intensity value for the at least one pixel by applying at least one numerical iteration on the first intensity value; and
   determine the pixel intensity value for the at least one pixel by modifying the second pixel intensity value based on the information about the gaze direction.

9. The controller of claim 8, wherein the controller is further configured to:
   apply a mapping transformation to the second pixel intensity value for the at least one pixel to map the second pixel intensity value from a focal plane of a display in the plurality of displays to a focal plane perpendicular to the gaze direction for the eye.

10. The controller of claim 1, wherein the controller is further configured to:
    instruct the plurality of displays to display the content across the plurality of displays, based in part on the determined pixel intensity value for the at least one pixel in the portion of the plurality of pixels.

11. The controller of claim 1, wherein the controller and the plurality of displays are part of a head-mounted display (HMD).

12. A head-mounted display (HMD) comprising:
    a plurality of displays configured to emit image light; and
    a controller configured to:
      obtain information about a gaze direction for an eye, and
      determine a pixel intensity value for at least one pixel in a portion of a plurality of pixels of a plurality of displays to generate content for presentation, based at least in part on the information about the gaze direction and decomposition of a scene related to the content displayed across the plurality of displays.

13. The HMD of claim 12, wherein the controller is further configured to:
    determine information about an accommodation of the eye responsive to decomposition of the scene related to the content displayed across the plurality of displays, based on the determined pixel intensity value for the at least one pixel; and
    modify the information about the gaze direction based in part on the determined information about the accommodation of the eye.

14. The HMD of claim 12, wherein the controller is further configured to:
    determine a plurality of correlation values related to the plurality of pixels of the plurality of displays;
    determine a first pixel intensity value for the at least one pixel by modifying an initial pixel intensity value for the at least one pixel using at least one numerical iteration applied on blur gradient correlation values obtained based on the plurality of correlation values;
    determine a second pixel intensity value for the at least one pixel by applying at least one numerical iteration on the first intensity value; and
    determine the pixel intensity value for the at least one pixel by modifying the second pixel intensity value based on the information about the gaze direction.

15. The HMD of claim 14, wherein the controller is further configured to:
    apply a mapping transformation to the second pixel intensity value for the at least one pixel to map the second pixel intensity value from a focal plane of a display in the plurality of displays to a focal plane perpendicular to the gaze direction for the eye.

16. The HMD of claim 12, wherein the information about the gaze direction includes at least one of a vector gaze direction of the eye, and a distance between a center point of the eye and an origin point perpendicular to a center of a display of the plurality of displays, and the controller is further configured to:
adjust the pixel intensity value based on the distance and a change in the vector gaze direction.

17. A computer program product comprising a non-transitory computer-readable storage medium having instructions encoded thereon that, when executed by one or more processors, cause the one or more processors to:
obtain information about a gaze direction for an eye; and
determine a pixel intensity value for at least one pixel in a portion of a plurality of pixels of a plurality of displays to generate content for presentation, based at least in part on the information about the gaze direction and decomposition of a scene related to the content displayed across the plurality of displays.

18. The computer program product of claim 17, wherein an optical distance between the eye and at least one display in the plurality of displays is adjustable, and the instructions further cause the one or more processors to change the optical distance based on a measured accommodation of the eye.

19. The computer program product of claim 17, wherein the instructions further cause the one or more processors to:
determine information about an accommodation of the eye responsive to decomposition of the scene related to the content displayed across the plurality of displays, based on the determined pixel intensity value for the at least one pixel; and
modify the information about the gaze direction based in part on the determined information about the accommodation of the eye.

20. The computer program product of claim 17, wherein the instructions further cause the one or more processors to:
determine a plurality of correlation values related to the plurality of pixels of the plurality of displays;
determine a first pixel intensity value for the at least one pixel by modifying an initial pixel intensity value for the at least one pixel using at least one numerical iteration applied on blur gradient correlation values obtained based on the plurality of correlation values;
determine a second pixel intensity value for the at least one pixel by applying at least one numerical iteration on the first intensity value; and
determine the pixel intensity value for the at least one pixel by modifying the second pixel intensity value based on the information about the gaze direction.

* * * * *